United States Patent
Ting

(10) Patent No.: US 7,983,035 B1
(45) Date of Patent: Jul. 19, 2011

(54) SLIDING TABLE OF A TABLET PERSONAL COMPUTER

(76) Inventor: Shao-Chieh Ting, Banchiau (TW)

( * ) Notice: Subject to any disclaimer, the term of this patent is extended or adjusted under 35 U.S.C. 154(b) by 0 days.

(21) Appl. No.: 12/876,733

(22) Filed: Sep. 7, 2010

(51) Int. Cl.
*G06F 1/16* (2006.01)
*H05K 5/00* (2006.01)
*H05K 7/00* (2006.01)

(52) U.S. Cl. .............................. 361/679.41; 361/679.55

(58) Field of Classification Search .. 361/679.4–679.45, 361/679.55; 439/374; 710/303
See application file for complete search history.

(56) References Cited

U.S. PATENT DOCUMENTS

| | | | |
|---|---|---|---|
| 5,555,491 A * | 9/1996 | Tao | 361/679.43 |
| 5,758,935 A * | 6/1998 | Coonan | 312/223.3 |
| 5,818,690 A * | 10/1998 | Spencer | 361/679.09 |
| 5,961,192 A * | 10/1999 | Bernart et al. | 312/223.3 |
| 6,179,264 B1 * | 1/2001 | Moy et al. | 248/349.1 |
| 6,370,021 B1 * | 4/2002 | Hinzpeter et al. | 361/679.6 |
| 6,483,698 B1 * | 11/2002 | Loh | 361/679.41 |
| 6,691,961 B2 * | 2/2004 | Solomon et al. | 248/129 |
| 7,009,840 B2 * | 3/2006 | Clark et al. | 361/679.41 |
| 7,137,603 B2 * | 11/2006 | Solomon et al. | 248/129 |
| 2006/0013411 A1 * | 1/2006 | Lin | 381/87 |
| 2006/0054751 A1 * | 3/2006 | Johnson et al. | 248/123.11 |
| 2006/0061964 A1 * | 3/2006 | Cheng | 361/687 |
| 2006/0250367 A1 * | 11/2006 | Tabasso et al. | 345/168 |
| 2007/0241452 A1 * | 10/2007 | Wu et al. | 257/722 |
| 2008/0316692 A1 * | 12/2008 | Jacobs et al. | 361/683 |
| 2009/0154079 A1 * | 6/2009 | Bae | 361/679.02 |
| 2010/0046169 A1 * | 2/2010 | Hu | 361/707 |
| 2010/0195279 A1 * | 8/2010 | Michael | 361/679.41 |

* cited by examiner

Primary Examiner — Jayprakash N Gandhi
Assistant Examiner — Adrian S Wilson
(74) Attorney, Agent, or Firm — Muncy, Geissler, Olds & Lowe, PLLC

(57) ABSTRACT

The present invention discloses a sliding table which is used below a tablet personal computer. A front edge of the sliding table is provided with a hand-rest pad and a control platen device; whereas, a bottom at a rear side of the sliding table is provided with rollers. A tablet personal computer can move front and back or rotate left and right only by pressing the control platen device. On the other hand, through provision of a keyboard dock, the tablet personal computer can be put on the sliding table to facilitate operating movable brackets which can be replaced by a vertical mini audio device or barrel-shaped speakers, as well.

6 Claims, 12 Drawing Sheets

SLIDING TABLE OF A TABLET PERSONAL COMPUTER

BACKGROUND OF THE INVENTION a) Field of the Invention

The present invention relates to a sliding table of a tablet personal computer, and more particularly to a sliding table which allows a tablet personal computer to be put horizontally or reclined vertically on the sliding table to facilitate a user to touch a screen. In addition, the tablet personal computer can be put vertically on the sliding table and can move front and back or rotate left and right on a working platform, in association with a keyboard dock.

b) Description of the Prior Art

As development of technologies, one must pursue a small size and a light weight for a tablet personal computer that a user can carry it conveniently. However, when a tablet personal computer is getting smaller, user convenience in operation will be limited in someway.

Accordingly, a lot of sliding tables of the tablet personal computers arise in markets to facilitate operation and use. Nevertheless, the sliding tables of the tablet personal computers sold on the markets are not convenient to be displaced freely on the working platforms and when the user needs to change a position, the computer and the sliding table should be lifted together to move, which wastes time and labor work. According to the present invention, through rollers and a control platen device, the sliding table of the tablet personal computer facilitates the user to operate and use.

Moreover, most of the sliding tables sold on the markets can only allow the tablet personal computers to be put vertically, which is not advantageous for touching the screen. The sliding table of the tablet personal computer, according to the present invention, can allow the tablet personal computer to be put vertically, reclined vertically or horizontally on the sliding table, through movable brackets or use in association with the keyboard dock.

SUMMARY OF THE INVENTION

The primary object of the present invention is to provide a device for stacking a tablet personal computer. The device includes primarily a sliding table body, a control platen device, plural movable brackets, plural rollers and plural foot pads.

Another object of the present invention is to provide a sliding table of a tablet personal computer, wherein through the provision of the movable brackets, the tablet personal computer can be put vertically or reclined horizontally on the sliding table, facilitating a user to touch a screen.

Still another object of the present invention is to provide a sliding table of a tablet personal computer, wherein by using in association with a keyboard dock, the tablet personal computer can be put vertically on the keyboard dock or can be reclined vertically or horizontally on a rear bracket of the keyboard dock and the sliding table, which even more facilitates the user to operate the keyboard and touch the screen.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
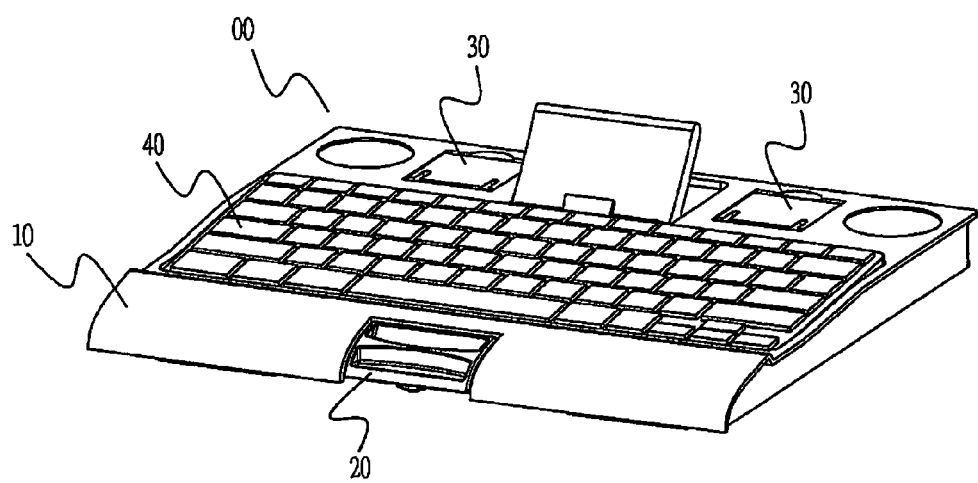
FIG. 1 shows a three-dimensional schematic view of a sliding table of a tablet personal computer, according to the present invention.
Figure 2:
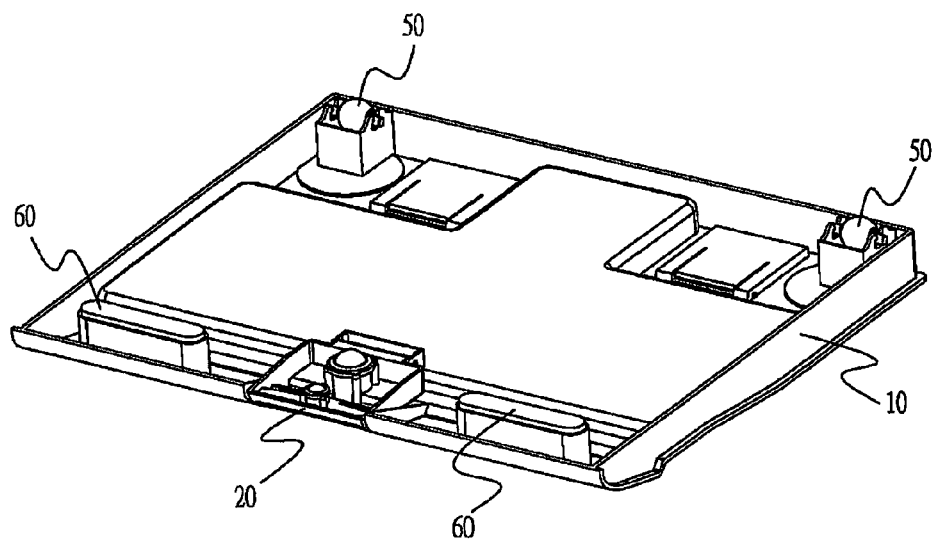
FIG. 2 shows a three-dimensional schematic view of a bottom surface of the sliding table of a tablet personal computer, according to the present invention.

Referring to FIG. 1 and FIG. 2, it shows a sliding table of the present invention. As shown in the drawings, a sling table 00 of the present invention comprises a sliding table body 10, a control platen device 20, plural movable brackets 30, a keyboard dock 40, plural rollers 50 and plural foot pieces 60.

Figure 3:
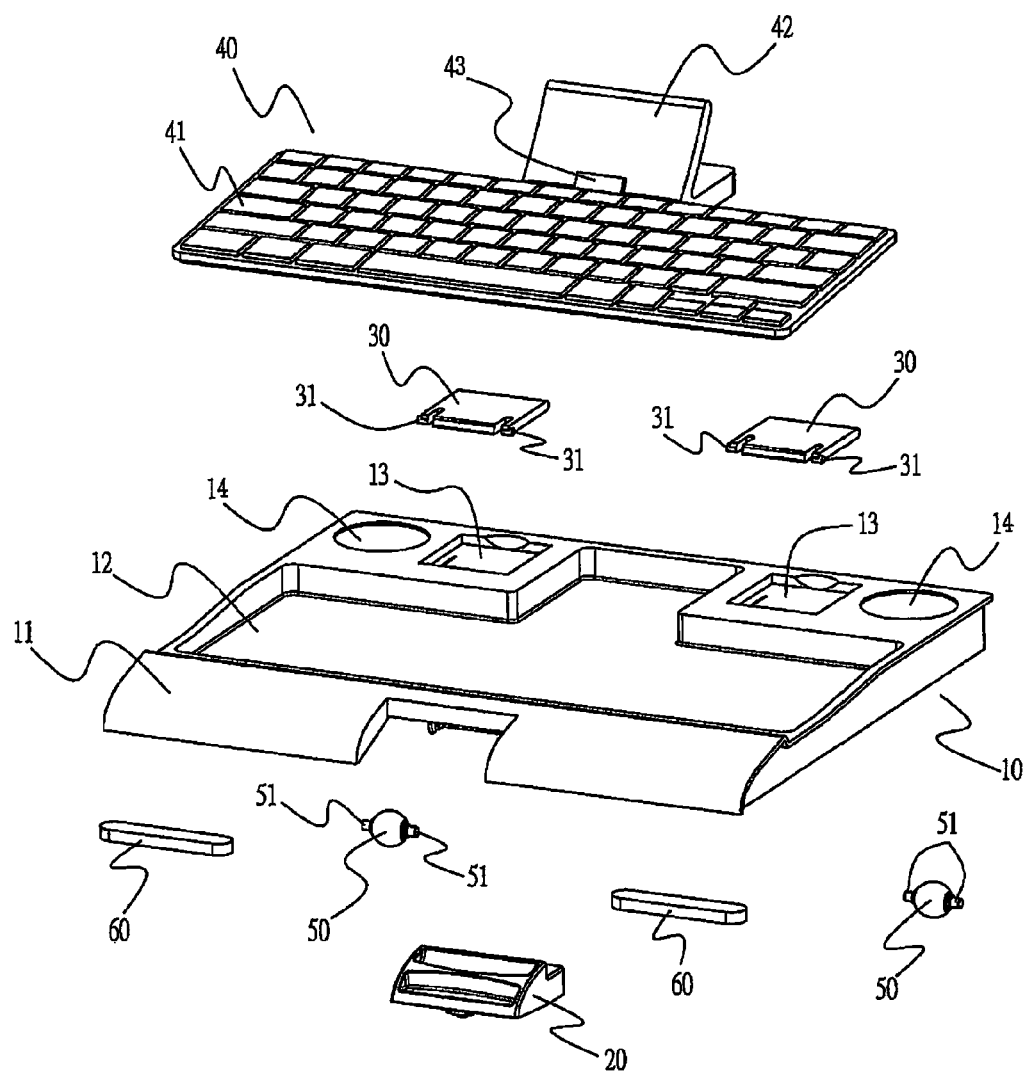
FIG. 3 shows a three-dimensional exploded view of the sliding table of a tablet personal computer, according to the present invention.
Figure 4:
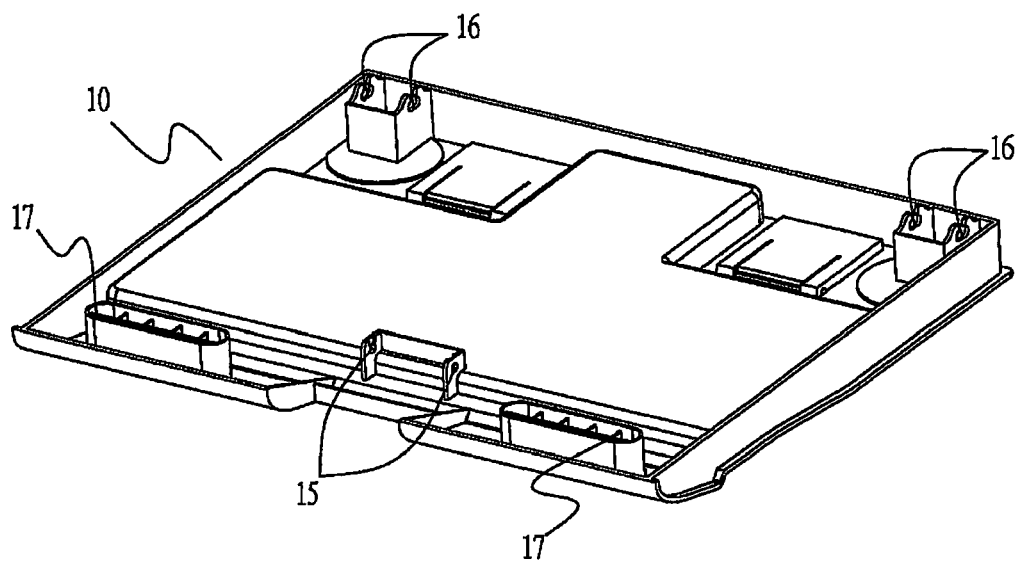
FIG. 4 shows a three-dimensional schematic view of a bottom surface of a sliding table body of the sliding table of a tablet personal computer, according to the present invention.
Figure 5:
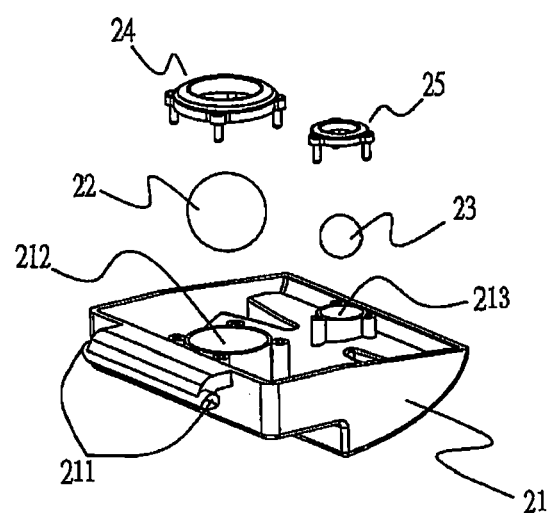
FIG. 5 shows a three-dimensional exploded view of a control platen device of the sliding table of a tablet personal computer, according to the present invention.

Referring to FIG. 3 and FIG. 4 at a same time, the sliding table body 10 is used to stack a tablet personal computer and is provided with a hand-rest pad 11, a keyboard dock emplacement slot 12, plural movable bracket emplacement slots 13, two vertical mini audio device emplacement slots 14, two control platen device sheath holes 15, plural roller sheath holes 16 and plural foot piece slots 17.

Referring to FIG. 1 to FIG. 5, a middle part at a front of the sliding table body 10 is provided with the control platen device 20 which is provided with a platen body 21, a large rolling ball 22, a large rolling ball cap 24, a small rolling ball 23 and a small rolling ball cap 25. Two sides at a front end of the platen body 21 are provided with body pivots 211 and through sheathing with the control platen device sheath holes 15 on the sliding table body 10, the sliding table 00 can rotate and move front and back on a working platform. A bottom of the platen body 21 is provided with a large and small rolling ball slot 212, 213.

The movable bracket 30 is provided with bracket pivots 31 which are sheathed with shaft holes (not shown in the drawings) at two sides of the movable bracket emplacement slots 13 on the sliding table body 10, allowing the brackets to be rotated out to be lifted up or rotated back for collection.

The keyboard dock 40 is provided with keys 41, a rear bracket 42 and a plug 43.

Two ends of the roller 50 are provided with roller pivots 51 which are sheathed with the roller sheath holes 16 at a bottom of a rear side of the sliding table body 10; therefore, the sliding table 00 can move and rotate on the working platform in association with the use of the control platen device 20.

The foot pieces 60 are placed in the foot piece slots 17 at a bottom of a front side of the sliding table body 10. Through this provision, the sliding table 00 can be stably fixed on the working platform without using the control platen device 20, in order to prevent from moving.

Figure 6A:
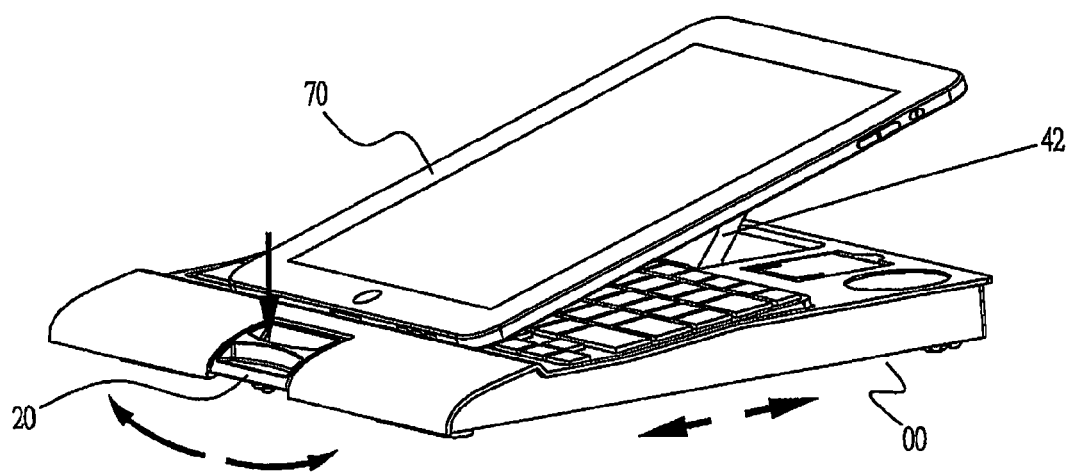
FIG. 6A shows a three-dimensional schematic view of a tablet personal computer, which is reclined vertically on a rear bracket of a keyboard dock and on the sliding table.
Figure 6B:
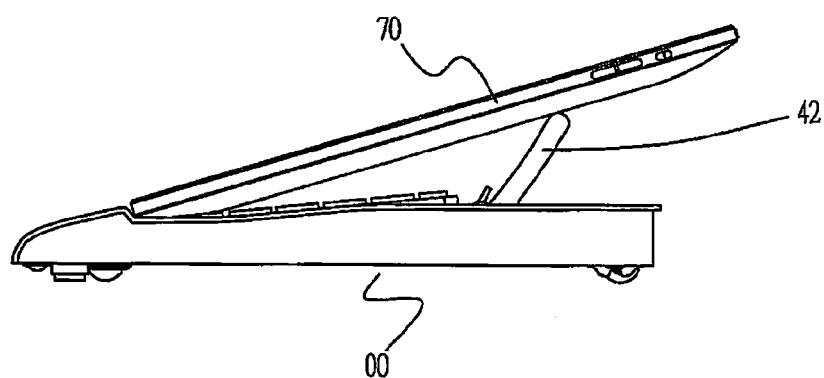
FIG. 6B shows a side view of the tablet personal computer, which is reclined vertically on the rear bracket of the keyboard dock and on the sliding table.

Referring to FIG. 6A and FIG. 6B, it shows a three-dimensional schematic view and a side view of a tablet personal computer 70 which is reclined vertically on the rear bracket 42 of the keyboard dock 40 and on the sliding table 00. By pressing down the control platen device 20, the sliding table 00 can move front and back or rotate left and right on the working platform.

Figure 7A:
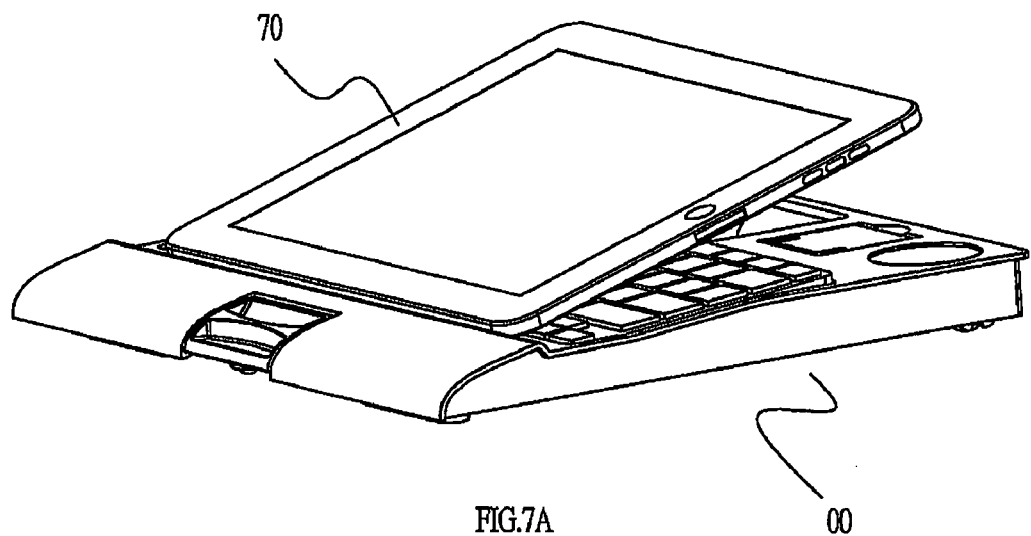
FIG. 7A shows a three-dimensional schematic view of a tablet personal computer, which is reclined horizontally on a rear bracket of a keyboard dock and on the sliding table.
Figure 7B:
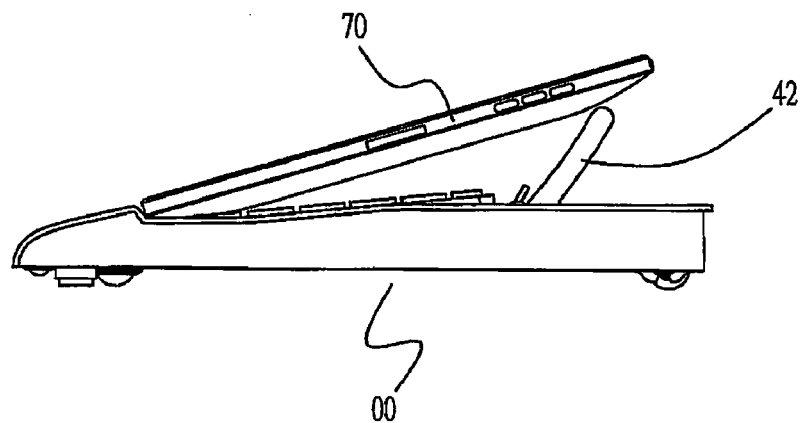
FIG. 7B shows a side view of the tablet personal computer, which is reclined horizontally on the rear bracket of the keyboard dock and on the sliding table.

Referring to FIG. 7A and FIG. 7B, it shows a three-dimensional schematic view and a side view of the tablet personal computer 70 which is reclined horizontally on the rear bracket 42 of the keyboard dock 40 and on the sliding table 00.

Figure 8A:
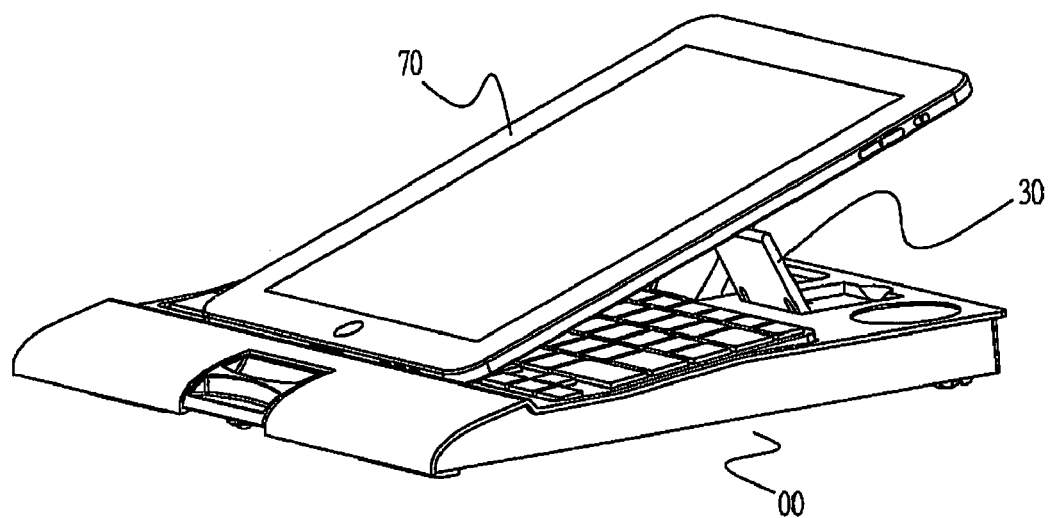
FIG. 8A shows a three-dimensional schematic view of a tablet personal computer, which is reclined vertically on movable brackets and a sliding table.
Figure 8B:
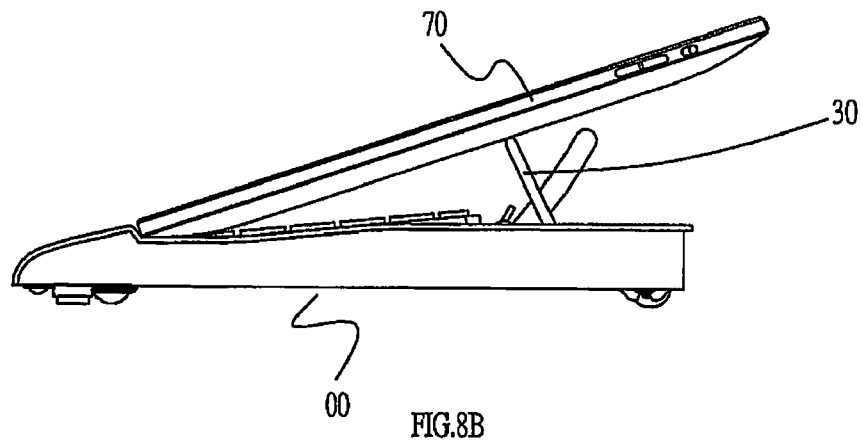
FIG. 8B shows a side view of the tablet personal computer, which is reclined vertically on the movable brackets and the sliding table.

Referring to FIG. 8A and FIG. 8B, it shows a three-dimensional schematic view and a side view of the tablet personal computer 70 which is reclined vertically on the movable brackets 30 and the sliding table 00.

Figure 9A:
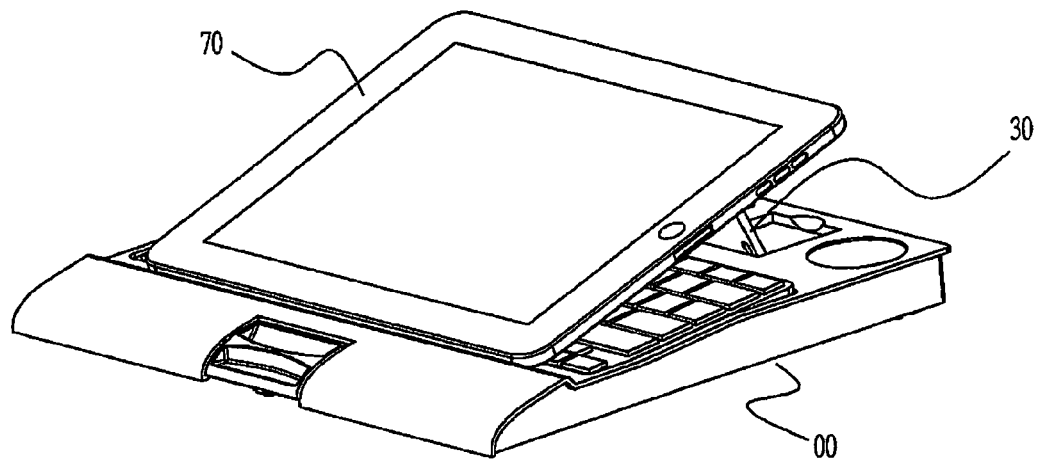
FIG. 9A shows a three-dimensional schematic view of a tablet personal computer, which is reclined horizontally on movable brackets and a sliding table.
Figure 9B:
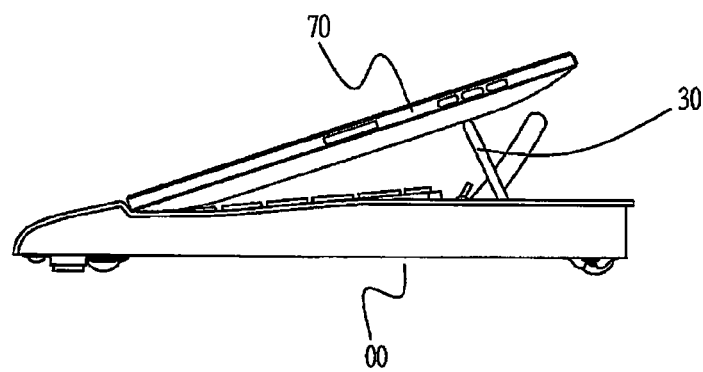
FIG. 9B shows a side view of the tablet personal computer, which is reclined vertically on the movable brackets and the sliding table.

Referring to FIG. 9A and FIG. 9B, it shows a three-dimensional schematic view and a side view of the tablet personal computer 70 which is reclined horizontally on the movable brackets 30 and the sliding table 00.

Figure 10:
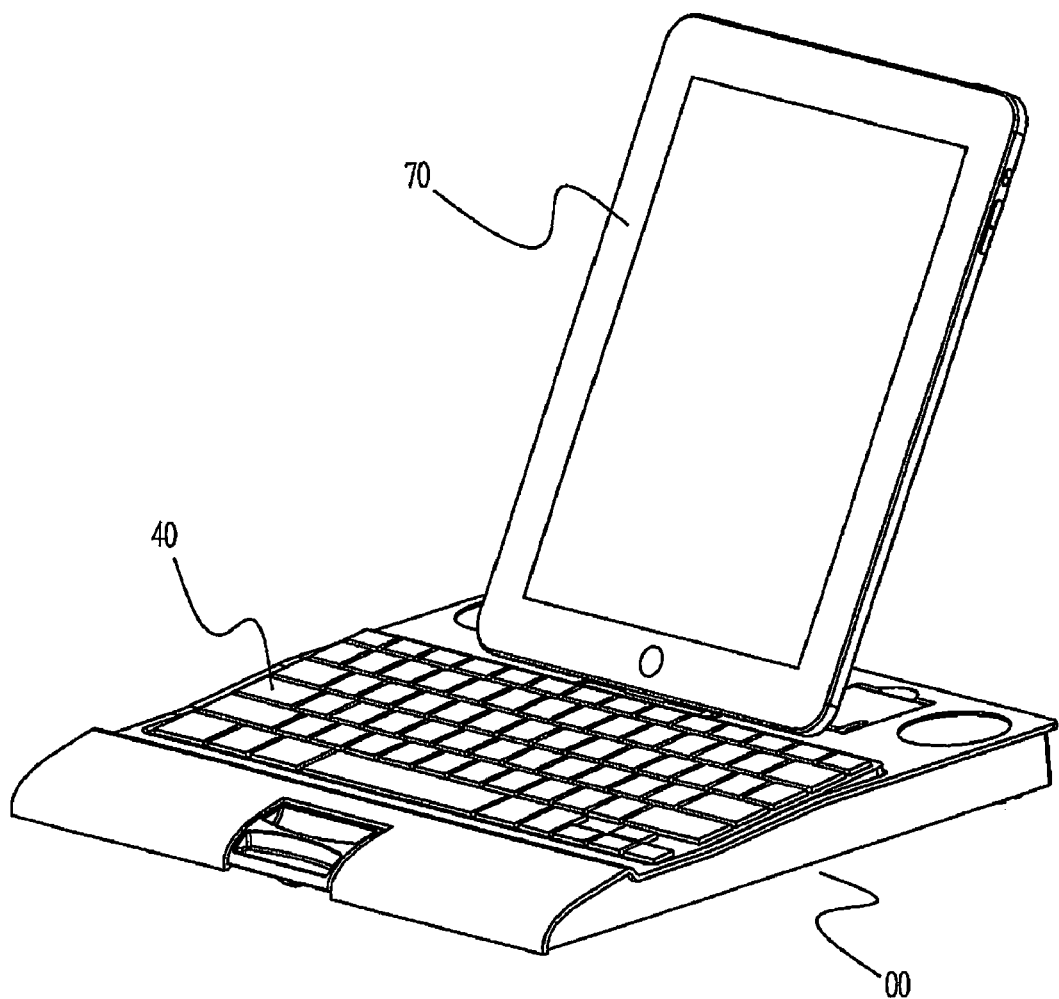
FIG. 10 shows a three-dimensional schematic view of a tablet personal computer, which is put vertically on a keyboard dock and a sliding table.

Referring to FIG. 10, it shows a three-dimensional schematic view of the tablet personal computer 70 which is put vertically on the keyboard dock 40 and the sliding table 00. This method can facilitate a user to operate an externally provided keyboard dock.

Figure 11:
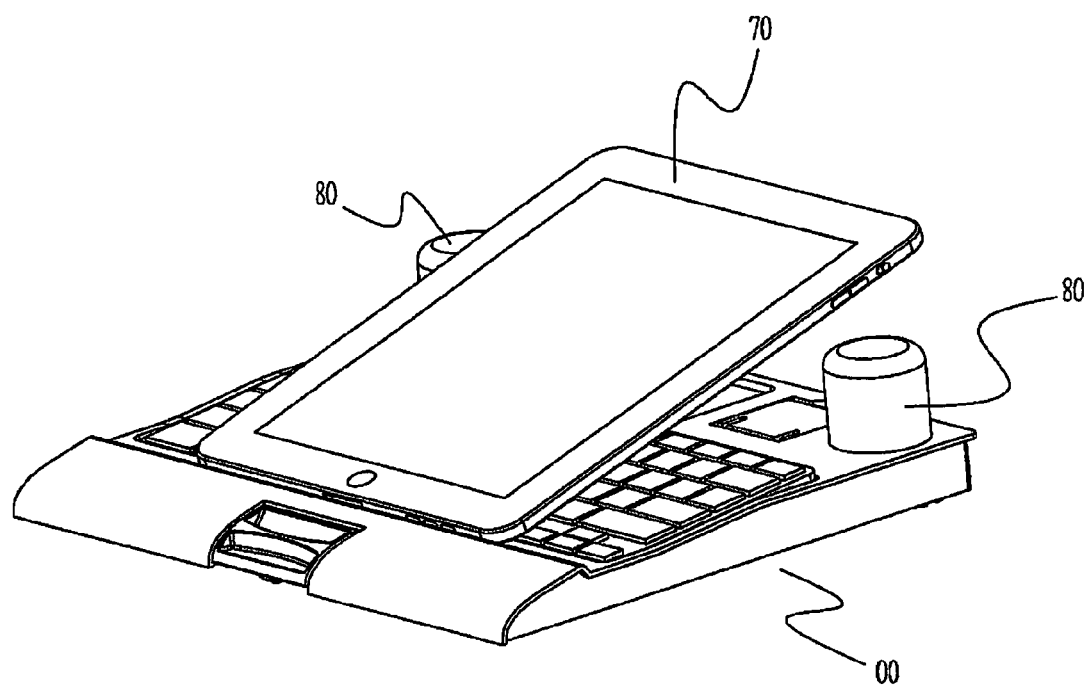
FIG. 11 shows a three-dimensional schematic view of a second embodiment where a mini stereo device is put on a sliding table.

Referring to FIG. 11, it shows a three-dimensional schematic view of a second embodiment of the present invention where a mini audio device 80 is put in the vertical mini audio emplacement slots 14 of the sliding table 00. The present invention can be added with audio equipment and can also serve as a support bracket.

Figure 12:
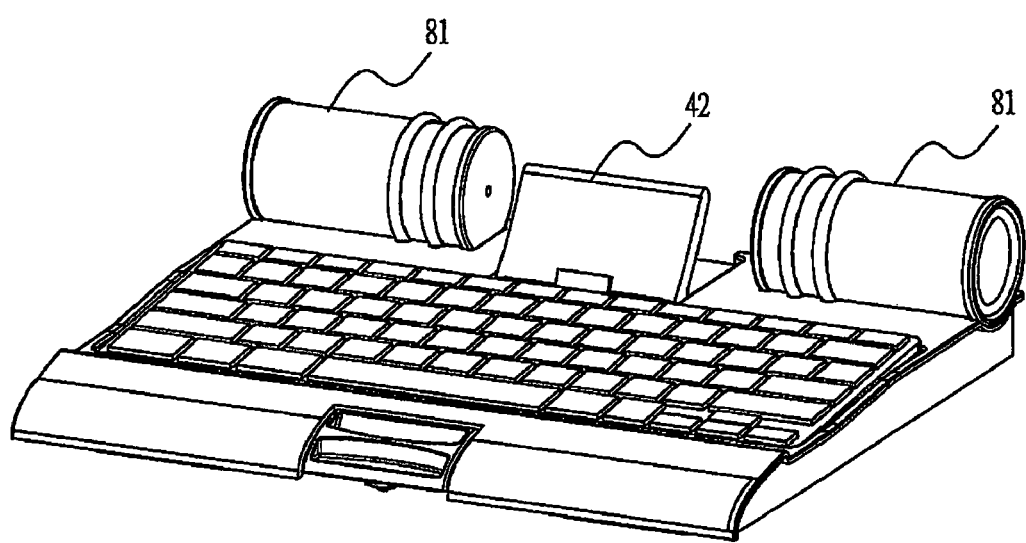
FIG. 12 shows a three-dimensional schematic view of a third embodiment of the sliding table of a tablet personal computer, according to the present invention.
Figure 14:
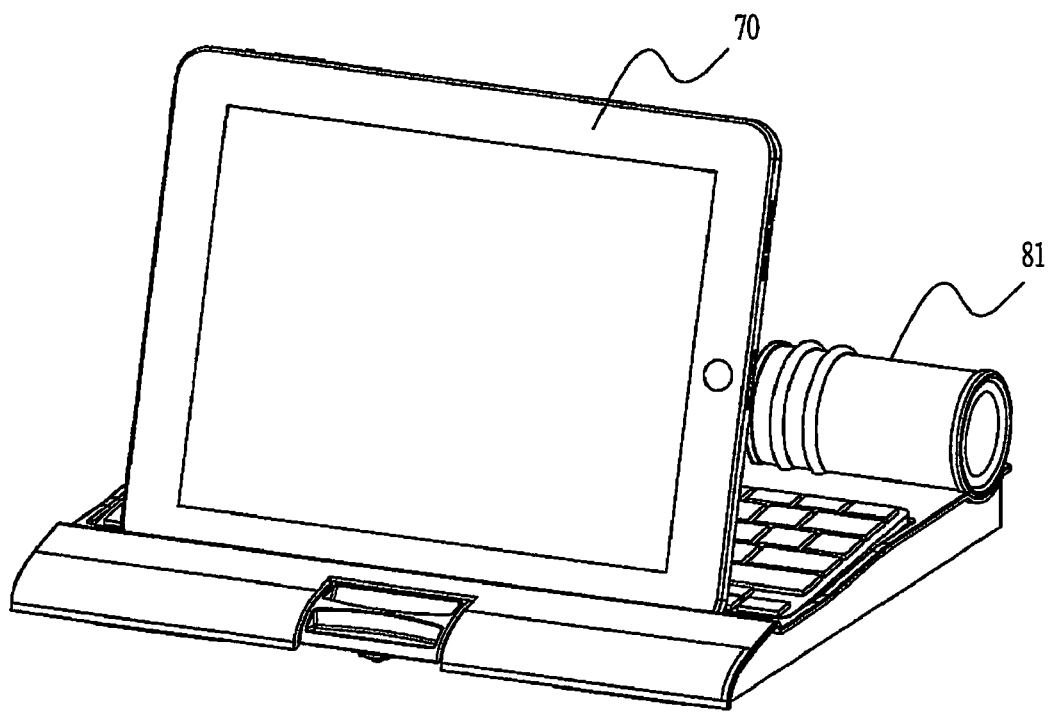
FIG. 14 shows a three-dimensional schematic view of a tablet personal computer which is put on a sliding table, according to the present invention.

Referring to FIG. 12, it shows a three-dimensional schematic view of a third embodiment of the sliding table of a tablet personal computer, according to the present invention. Two sides of the rear bracket 42 are equipped with a barrel-shaped speaker 81, which not only increases design beauty and an audio effect, but also is provided with a function of to support bracket; this can be fully demonstrated from FIG. 14.

Figure 13:
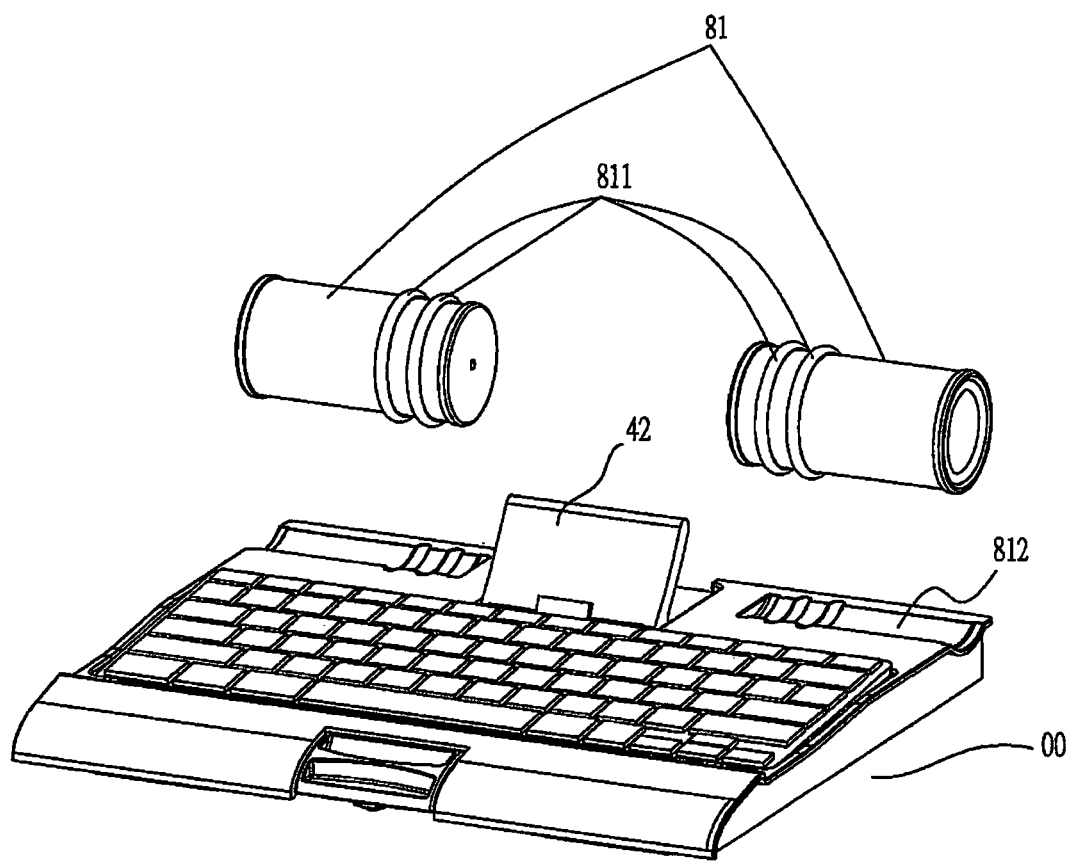
FIG. 13 shows a three-dimensional exploded view of the third embodiment of the sliding table of a tablet personal computer, according to the present invention.

Referring to FIG. 13 at a same time, it shows a three-dimensional exploded view of the third embodiment of the sliding table of a tablet personal computer, according to the present invention. A pair of barrel-shaped speaker 81, on which is provided with soft rubber rings 811, is put in barrel-shaped speaker grooves 812 at two sides of the rear bracket 42 of the sliding table 00, with that the soft rubber rings 811 are provided with a skid-proof function.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A sliding table of a tablet personal computer, comprising:
   a sliding table body which is used to stack a tablet personal computer and on which is provided with a hand-rest pad, a keyboard dock emplacement slot, movable bracket emplacement slots, vertical mini audio device emplacement slots, roller sheath holes and food piece slots;
   a control platen device which is sheathed with shaft holes at a bottom of a front side of the sliding table body;
   plural movable brackets which are sheathed with shaft holes in the movable bracket emplacement slots at a rear end of the sliding table body;
   the keyboard dock, through which a tablet personal computer is put on the sliding table;
   plural rollers which are sheathed at a bottom of a rear side of the sliding table body; and
   plural foot pieces which are put in the foot piece slots at a bottom of a front side of the sliding table body.

2. The sliding table of a tablet personal computer, according to claim 1, wherein the movable brackets are rotated out to facilitate a tablet personal computer to be reclined on the brackets and the sliding table, with the movable brackets being rotated back for collection, as well.

3. The sliding table of a tablet personal computer, according to claim 1, wherein the rollers and the control platen device drive the sliding table to move front and back or rotate left and right on a working platform.

4. The sliding table of a tablet personal computer, according to claim 1, wherein the tablet personal computer is put vertically on the sliding table, or reclined vertically or horizontally on a rear bracket of the keyboard dock and on the sliding table.

5. A sliding table of a tablet personal computer, comprising:
   a sliding table body which is used to stack a tablet personal computer and on which is provided with a hand-rest pad, a keyboard dock emplacement slot, movable bracket emplacement slots, barrel-shaped speaker grooves, roller sheath holes and foot piece slots;
   a control platen device which is sheathed with shaft holes at a bottom of a front end of the sliding table body;
   a pair of barrel-shaped speaker which is provided with soft rubber rings and is put in the barrel-shaped speaker grooves at two sides of a rear bracket of the sliding table;
   a keyboard dock, through which a tablet personal computer is put vertically on the sliding table, or reclined vertically or horizontally on the rear bracket of the keyboard dock and on the sliding table;
   plural rollers which are sheathed at a bottom of a rear side of the sliding table body; and
   plural foot pieces which are put in the foot piece slots at a bottom of a front side of the sliding table body.

6. The sliding table of a tablet personal computer, according to claim 5, wherein the rollers and the control platen device drive the sliding table to move front and back or rotate left and right on a working platform.

* * * * *